UNITED STATES PATENT OFFICE.

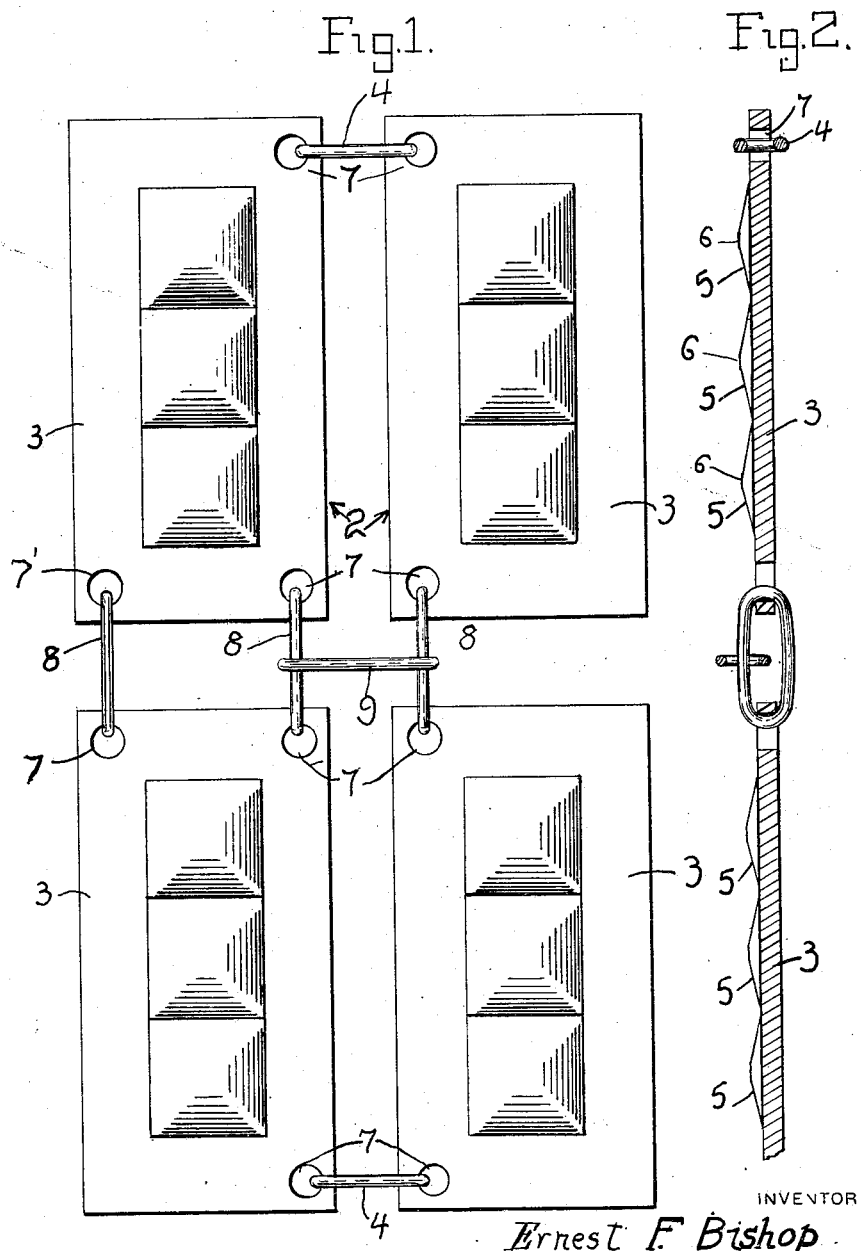

ERNEST F. BISHOP, OF WINNIPEG, MANITOBA, CANADA.

TRACTION-MAT FOR MOTOR-VEHICLES.

1,261,898.   Specification of Letters Patent.   Patented Apr. 9, 1918.

Application filed October 25, 1917. Serial No. 198,522.

*To all whom it may concern:*

Be it known that I, ERNEST F. BISHOP, a subject of the King of Great Britain, residing at Winnipeg, in the Province of Manitoba and Dominion of Canada, have invented certain new and useful Improvements in Traction-Mats for Motor-Vehicles, of which the following is a specification.

This invention relates to traction mats for extricating stalled motor vehicles.

The object of the invention is to provide a simple and efficient device to provide a traction footing for the motor vehicle which has been stalled in mud, sand or snow to enable the traction wheels of the vehicle to take hold and readily propel the vehicle thereby avoiding racking, grinding and tearing of the vehicle usually attendant on such stalling.

Another object is to so construct a portable traction mat that it will conform to the shape of both the tire and the hole in which the wheel is stalled and yet not sink into the soft surface, acting on the principle of a snow shoe.

Another object is to so construct a mat of this character that it may embody compactness when not in use, being adapted to roll up like a tool kit and be stowed away in a small space.

It is well known to motorists that even with non-skid chains it is often impossible to climb out of a bad hole because of insufficient traction surface, and that it is almost impossible to jack up a car under such circumstances owing to the soft condition of the earth adjacent the hole, which fails to afford a firm foundation for the jack. It is to overcome such difficulties that this device is designed.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of a mat constructed in accordance with this invention, and Fig. 2 is a side elevation thereof.

In the embodiment illustrated the traction mat 1 constituting this invention is shown composed of a plurality of series 2 of longitudinally alined plates 3, two of said series being here shown arranged in parallel relation. The plates of adjacent series are arranged in alinement and flexibly connected by links 4. The plates 3 are preferably constructed of galvanized sheet metal and in rectangular form, said plates being preferably about two inches wide and four inches long and one-twelfth of an inch thick, more or less, it of course being understood that these sizes may be varied according to the size of the mat to be constructed and the weight of the vehicle in connection with which it is to be used, since those suitable for large and heavy vehicles would be unnecessarily heavy and bulky for lighter vehicles. These plates 3 have on their upper or traction faces a plurality of pyramidal projections 5 which are stamped, pressed or otherwise raised on the plates and are provided with blunt apices shown at 6 to prevent cutting of the tires of the vehicle in connection with which the mat is to be used. These pyramidal projections 5 are preferably about one-eighth of an inch high but obviously the height may be varied, and the arrangement of the projections may also be varied, it not being necessary to dispose them in longitudinal alinement as shown in the drawings.

Each of the plates 3 is provided with a plurality of apertures 7 to receive the connecting links 4 which unite the two series of plates and links 8 which connect the plates of each series. These apertures 7 are made larger than the links which they are designed to receive to provide for the flexibility of the mat and to facilitate the rolling thereof for storage.

The plates 3 of the two series are shown along their inner or adjacent edges provided at the corners with the apertures 7, the links 4 which connect the plates of the two series through said apertures being shown arranged transversely of the mat while links 8 which connect the plates of each series are arranged longitudinally and the links 8 are connected by other links 9 which are also arranged transversely of the mat forming a connection at this point in the shape of the letter H. It is to be understood that any desired number of these plates may be used according to the length of the mat to be produced, the usual size of such a mat being about six feet eight inches long, employing in its construction about eighteen plates.

It will thus be seen that by so constructing the mat constituting this invention, it will be semi-flexible, the plates 3 being substantially rigid while the links 4, 8 and 9 which connect them provide flexibility sufficient to adapt the mat to conform to the shape of the tire and to the hole or depression in which the tire rests and yet afford sufficient rigidity to present a suitable traction surface to permit the wheel to pass out of said hole over said mat. The rigidity of the plates permit the device to operate on the principle of a snow shoe and the blunt pyramidal projections 5 provide the necessary traction surface without cutting into the rubber of the tire, enabling the car to roll out of the hole with only a normal use of its power.

In the use of this improved mat, all that is necessary is to place one with the top thereof against that part of the tire nearest the ground and in advance of the wheel, and the engine being set in motion, the first half revolution of the wheel would operate to pinch the mat underneath the tire and cause the car to roll out of the hole over the portion of the mat disposed in front of the wheels.

While one mat is usually sufficient to extricate a car it is desirable that two be carried in the equipment which will operate as substitutes for and eliminate the necessity of using chains for this purpose.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. A portable traction mat of the class described comprising a plurality of sheet metal plates having outstruck projections to form a traction surface, links flexibly connecting said plates, some of said links extending transversely and some longitudinally of the mat.

2. A portable traction mat of the class described comprising a plurality of flexibly connected metal plates having outstruck pyramidal projections with blunt apices to provide a traction surface.

3. A portable traction mat of the class described comprising a plurality of flexibly connected metal plates having outstruck pyramidal projections with blunt apices to provide a traction surface, said projections being arranged in longitudinal alinement.

4. A portable traction mat of the class described comprising a plurality of rectangular metal plates arranged in transverse and longitudinal alinement, links flexibly connecting the plates and other links connecting some of the connecting links.

In testimony whereof I affix my signature in presence of two witnesses.

ERNEST F. BISHOP.

Witnesses:
J. C. GREEN ALGTAGH,
E. A. HARRIS.

Copies of this patent may be obtained for five cents each, by addressing the "Commissioner of Patents, Washington, D. C."